US012565192B2

(12) United States Patent
Schur et al.

(10) Patent No.: US 12,565,192 B2
(45) Date of Patent: Mar. 3, 2026

(54) SYSTEM, METHOD, AND COMPUTER PROGRAM PRODUCT FOR IDENTIFICATION OF INTENTION AND PREDICTION FOR PARALLEL PARKING VEHICLES

(71) Applicant: FORD GLOBAL TECHNOLOGIES, LLC, Dearborn, MI (US)

(72) Inventors: Randall Schur, Pittsburgh, PA (US); Dale Lord, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 947 days.

(21) Appl. No.: 17/828,137

(22) Filed: May 31, 2022

(65) Prior Publication Data

US 2023/0382368 A1 Nov. 30, 2023

(51) Int. Cl.
*B60W 30/06* (2006.01)
*B60W 40/12* (2012.01)
*B60W 60/00* (2020.01)

(52) U.S. Cl.
CPC ............ *B60W 30/06* (2013.01); *B60W 40/12* (2013.01); *B60W 60/0025* (2020.02); *B60W 2554/20* (2020.02); *B60W 2554/402* (2020.02); *B60W 2554/4041* (2020.02); *B60W 2554/80* (2020.02)

(58) Field of Classification Search
CPC .. B60W 30/06; B60W 30/09; B60W 30/0956; B60W 40/12; B60W 60/0025; B60W 60/0027; B60W 60/00274; B60W 2420/403; B60W 2554/20; B60W 2554/402; B60W 2554/404; B60W 2554/4041; B60W 2554/4042; B60W 2554/4046; B60W 2554/4049; B60W 2554/80; B60W 2554/804; B60W 2555/60; B62D 15/0285
See application file for complete search history.

(56) References Cited

U.S. PATENT DOCUMENTS

| | | | |
|---|---|---|---|
| 9,682,707 B1 * | 6/2017 | Silver | .................... G06V 20/58 |
| 11,079,764 B2 | 8/2021 | Nister et al. | |
| 11,126,868 B1 | 9/2021 | Silver et al. | |
| 12,269,462 B1 * | 4/2025 | Garimella | .......... B62D 15/0285 |
| 2020/0410853 A1 * | 12/2020 | Akella | ................. G05D 1/0055 |

* cited by examiner

*Primary Examiner* — Peter D Nolan
*Assistant Examiner* — Ce Li Li
(74) *Attorney, Agent, or Firm* — Frank A. MacKenzie; Brooks Kushman P.C.

(57) ABSTRACT

Disclosed herein are system, method, and computer program product embodiments for identification of intention and prediction for parallel parking vehicles. For example, the method includes: obtaining sensor data associated with an environment surrounding an autonomous vehicle; identifying, based on the sensor data, a plurality of static objects in the environment, an open parallel parking location between the plurality of static objects, and a vehicle in the environment that satisfies a parallel parking condition; generating a polygon that extends beyond a side and a rear of the vehicle that satisfies the parallel parking condition; and controlling movement of the autonomous vehicle based on a prediction that the vehicle is intending to parallel park in the open parking location, the prediction that the vehicle is intending to parallel park in the open parking location being determined based on an amount of the open parallel parking location that is contained within the polygon.

20 Claims, 7 Drawing Sheets

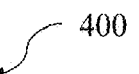

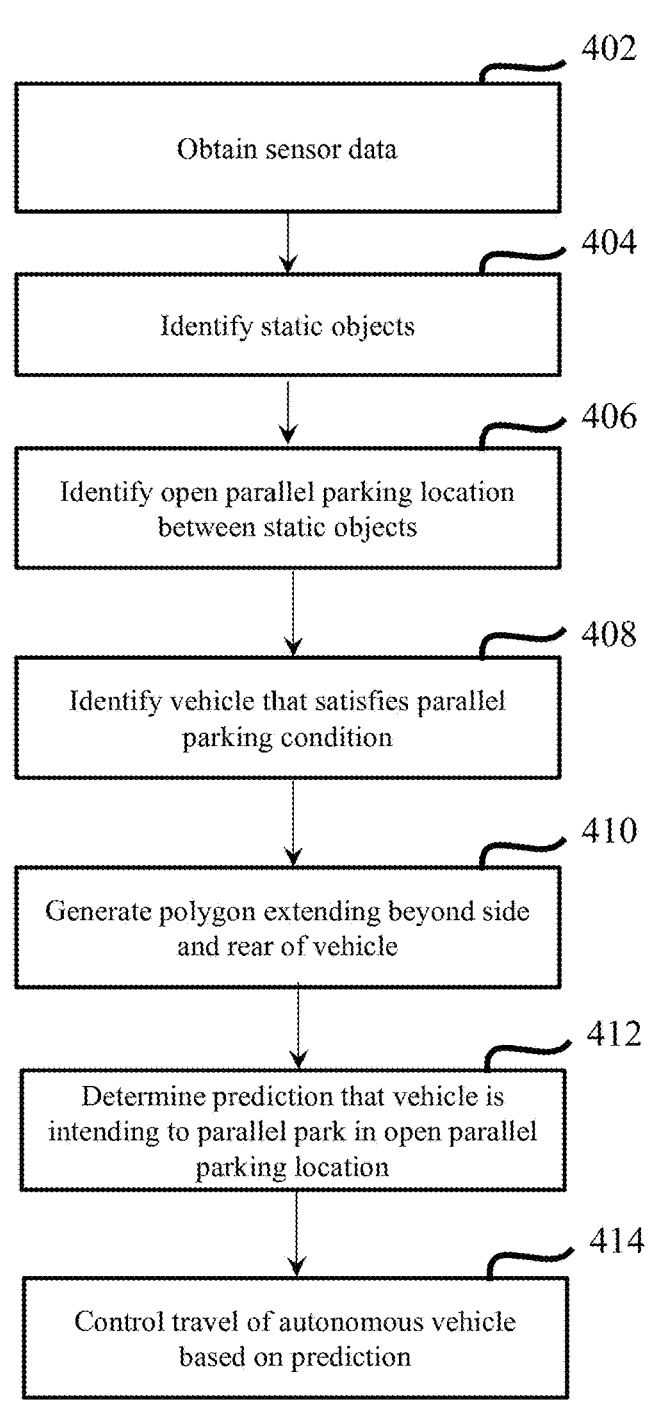

402

Obtain sensor data

404

Identify static objects

406

Identify open parallel parking location between static objects

408

Identify vehicle that satisfies parallel parking condition

410

Generate polygon extending beyond side and rear of vehicle

412

Determine prediction that vehicle is intending to parallel park in open parallel parking location

414

Control travel of autonomous vehicle based on prediction

Fig. 4

SYSTEM, METHOD, AND COMPUTER PROGRAM PRODUCT FOR IDENTIFICATION OF INTENTION AND PREDICTION FOR PARALLEL PARKING VEHICLES

BACKGROUND

Vehicles intending to parallel park or in the act of parallel parking may exhibit behavior that is not otherwise common on public roads. These vehicles may slow down and stop, often without other traffic or signals ahead, and/or they may start reversing.

SUMMARY

According to some non-limiting embodiments or aspects, provided is a method, including: obtaining, with at least one processor, sensor data associated with an environment surrounding an autonomous vehicle; identifying, with the at least one processor, based on the sensor data, a plurality of static objects in the environment, an open parallel parking location between the plurality of static objects, and a vehicle in the environment that satisfies a parallel parking condition; in response to identifying the vehicle that satisfies the parallel parking condition, generating, with the at least one processor, a polygon that extends beyond a side and rear of the vehicle that satisfies the parallel parking condition; and controlling, with the at least one processor, movement of the autonomous vehicle based on a prediction that the vehicle is intending to parallel park in the open parking location, wherein the prediction that the vehicle is intending to parallel park in the open parking location is determined based on an amount of the open parallel parking location that is contained within the polygon.

In some non-limiting embodiments or aspects, identifying the open parallel parking location includes determining, based on the plurality of static objects, one or more sides of the open parallel parking location.

In some non-limiting embodiments or aspects, the parallel parking condition includes at least one of the following conditions: an object classification associated with the vehicle, a size associated with the vehicle, a location associated with the vehicle, a current and/or prediction motion associated with the vehicle, or any combination thereof.

In some non-limiting embodiments or aspects, the polygon includes a predetermined area that extends beyond the side and the rear of the vehicle.

In some non-limiting embodiments or aspects, an area in which the polygon extends beyond the side and the rear of the vehicle is determined based on an attribute associated with the vehicle, and wherein the attribute associated with the vehicle includes at least one of the following: a size associated with the vehicle, a type associated with vehicle, or any combination thereof.

In some non-limiting embodiments or aspects, the prediction that the vehicle is intending to parallel park includes a probability that the vehicle is intending to parallel park.

In some non-limiting embodiments or aspects, controlling movement of the autonomous vehicle includes at least one of: controlling the autonomous vehicle to maintain a distance between the autonomous vehicle and the vehicle predicted to be parallel parking that is greater than a default distance and controlling the autonomous vehicle to bias lateral positioning within a lane or roadway to go around the vehicle predicted to be parallel parking.

According to some non-limiting embodiments or aspects, provided is a system, including: a memory; and at least one processor coupled to the memory and configured to: obtain sensor data associated with an environment surrounding an autonomous vehicle; identify, based on the sensor data, a plurality of static objects in the environment, an open parallel parking location between the plurality of static objects, and a vehicle in the environment that satisfies a parallel parking condition; in response to identifying the vehicle that satisfies the parallel parking condition, generate a polygon that extends beyond a side and a rear of the vehicle that satisfies the parallel parking condition; and control movement of the autonomous vehicle based on a prediction that the vehicle is intending to parallel park in the open parking location, wherein the prediction that the vehicle is intending to parallel park in the open parking location is determined based on an amount of the open parallel parking location that is contained within the polygon.

In some non-limiting embodiments or aspects, the at least one processor is further configured to identify the open parallel parking location by determining, based on the plurality of static objects, one or more sides of the open parallel parking location.

In some non-limiting embodiments or aspects, the parallel parking condition includes at least one of the following conditions: an object classification associated with the vehicle, a size associated with the vehicle, a location associated with the vehicle, a current and/or prediction motion associated with the vehicle, or any combination thereof.

In some non-limiting embodiments or aspects, the polygon includes a predetermined area that extends beyond the side and the rear of the vehicle.

In some non-limiting embodiments or aspects, an area in which the polygon extends beyond the side and the rear of the vehicle is determined based on an attribute associated with the vehicle, and wherein the attribute associated with the vehicle includes at least one of the following: a size associated with the vehicle, a type associated with vehicle, or any combination thereof.

In some non-limiting embodiments or aspects, the prediction that the vehicle is intending to parallel park includes a probability that the vehicle is intending to parallel park.

In some non-limiting embodiments or aspects, the at least one processor is further configured to control movement of the autonomous vehicle by at least one of: controlling the autonomous vehicle to maintain a distance between the autonomous vehicle and the vehicle predicted to be parallel parking that is greater than a default distance and controlling the autonomous vehicle to bias lateral positioning within a lane or roadway to go around the vehicle predicted to be parallel parking.

According to some non-limiting embodiments or aspects, provided is a non-transitory computer-readable medium having instructions stored thereon that, when executed by at least one computing device, cause the at least one computing device to perform operations including: obtaining sensor data associated with an environment surrounding an autonomous vehicle; identifying, based on the sensor data, a plurality of static objects in the environment, an open parallel parking location between the plurality of static objects, and a vehicle in the environment that satisfies a parallel parking condition; in response to identifying the vehicle that satisfies the parallel parking condition, generating a polygon that extends beyond a side and a rear of the vehicle that satisfies the parallel parking condition; and controlling movement of the autonomous vehicle based on a prediction that the vehicle is intending to parallel park in the open parking location, wherein the prediction that the vehicle is intending to parallel park in the open parking location is determined based on an amount of the open parallel parking location that is contained within the polygon.

In some non-limiting embodiments or aspects, the instructions, when executed by the at least one computing device, further cause the at least one computing device to identify the open parallel parking location by determining, based on the plurality of static objects, one or more sides of the open parallel parking location.

In some non-limiting embodiments or aspects, the parallel parking condition includes at least one of the following conditions: an object classification associated with the vehicle, a size associated with the vehicle, a location associated with the vehicle, a current and/or prediction motion associated with the vehicle, or any combination thereof.

In some non-limiting embodiments or aspects, the polygon includes a predetermined area that extends beyond the side and the rear of the vehicle.

In some non-limiting embodiments or aspects, an area in which the polygon extends beyond the side and the rear of the vehicle is determined based on an attribute associated with the vehicle, and wherein the attribute associated with the vehicle includes at least one of the following: a size associated with the vehicle, a type associated with vehicle, or any combination thereof.

In some non-limiting embodiments or aspects, the instructions, when executed by the at least one computing device, further cause the at least one computing device to control movement of the autonomous vehicle by at least one of: controlling the autonomous vehicle to maintain a distance between the autonomous vehicle and the vehicle predicted to be parallel parking that is greater than a default distance and controlling the autonomous vehicle to bias lateral positioning within a lane or roadway to go around the vehicle predicted to be parallel parking.

BRIEF DESCRIPTION OF THE DRAWINGS

The accompanying drawings are incorporated herein and form a part of the specification.

FIG. 4 illustrates an exemplary process, in accordance with aspects of the disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for identification of intention and prediction for parallel parking vehicles. Non-limiting embodiments or aspects of the present disclosure enable an autonomous vehicle to identify open parallel parking locations between static objects in an environment surrounding the autonomous vehicle, and if an actor with potential parking intentions is identified in the environment, a location of the actor relative to available parking spots is checked by generating a polygon around the actor location, shaped so that the polygon includes areas to the side and behind the actor, wherein whether the polygon contains or overlaps with the open parallel parking locations is used to determine whether the actor is intending to parallel park with some likelihood. Accordingly, once the actors with a parallel parking intention are determined, the autonomous vehicle may generate a forecast towards the intended parking spot that enables the autonomous vehicle to safely plan around the parking maneuver.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Figure 1:
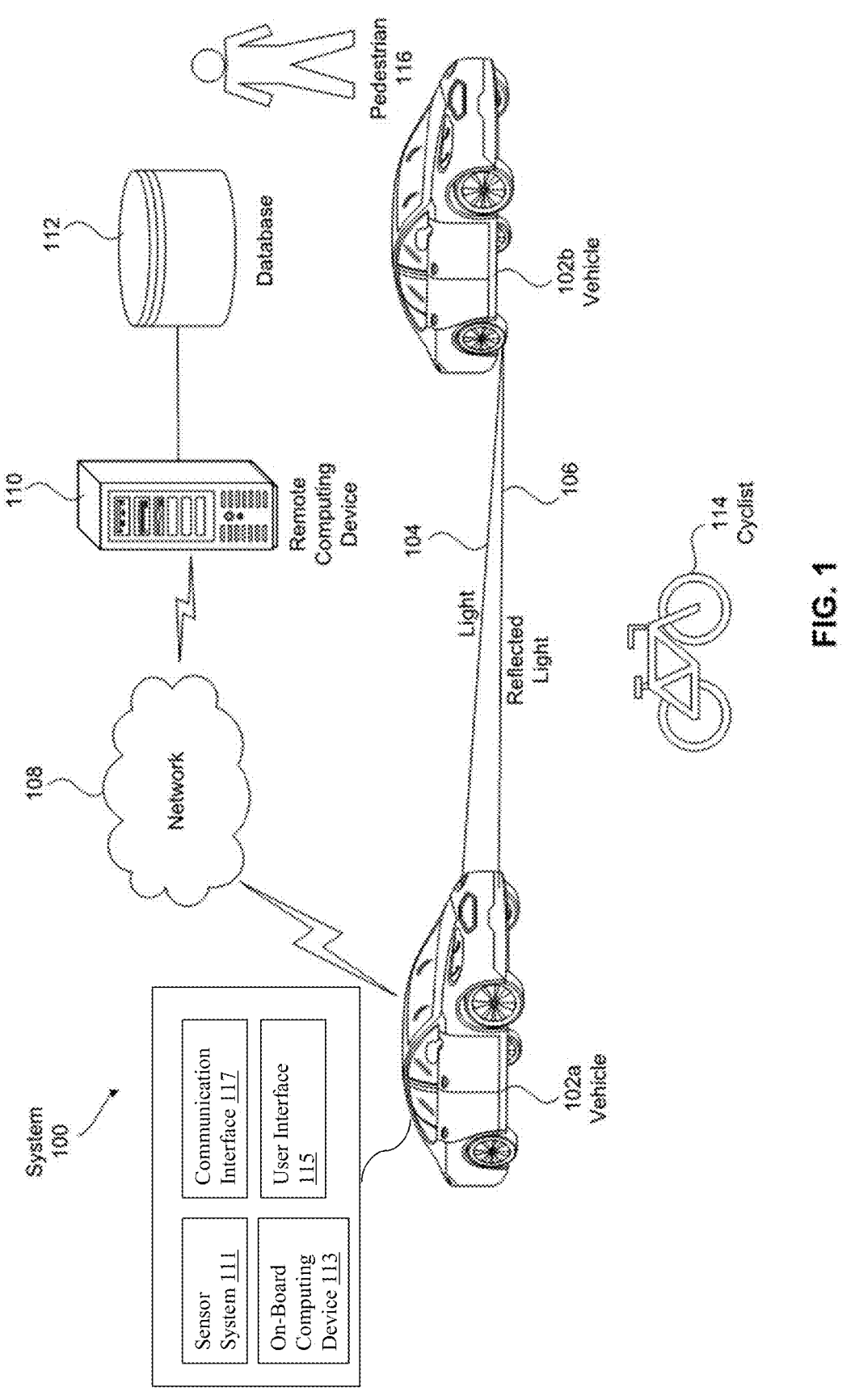
FIG. 1 illustrates an exemplary autonomous vehicle system, in accordance with aspects of the disclosure.

FIG. 1 illustrates an exemplary autonomous vehicle system 100, in accordance with aspects of the disclosure. System 100 comprises AV 102a that is traveling along a road in a semi-autonomous or autonomous manner. AV 102a is also referred to herein as AV 102a. AV 102a can include, but is not limited to, a land vehicle (as shown in FIG. 1), an aircraft, or a watercraft.

AV 102a is generally configured to detect objects 102b, 114, and 116 in proximity thereto. The objects can include, but are not limited to, a vehicle 102b, a cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
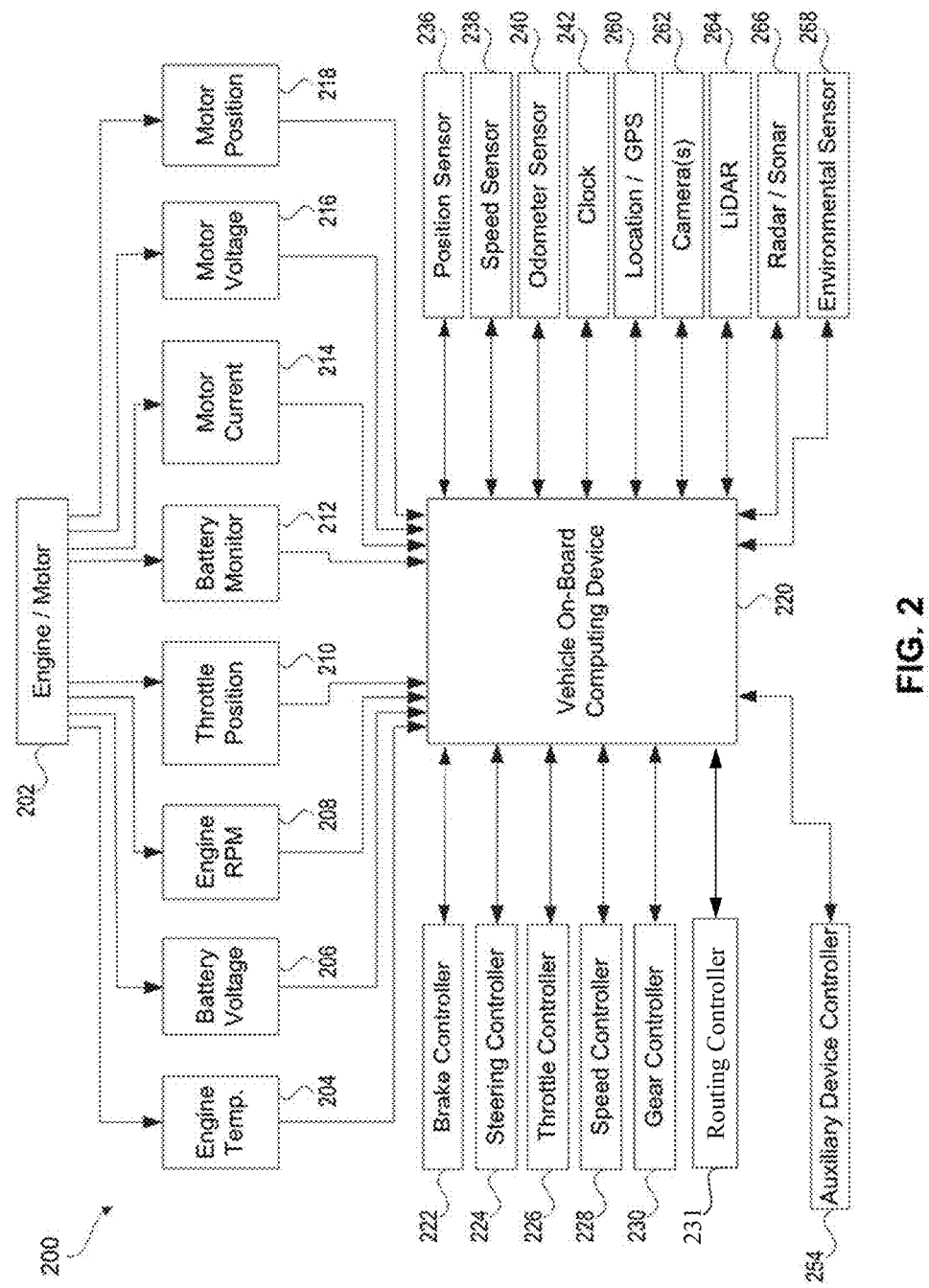
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a LiDAR system, e.g., LiDAR system 264 of FIG. 2. The LiDAR system may be configured to transmit a light pulse 104 to detect objects located within a distance or range of distances of AV 102a. Light pulse 104 may be incident on one or more objects (e.g., AV 102b) and be reflected back to the LiDAR system. Reflected light pulse 106 incident on the LiDAR system may be processed to determine a distance of that object to AV 102a. The reflected light pulse 106 may be detected using, in some embodiments, a photodetector or array of photodetectors positioned and configured to receive the light reflected back into the LiDAR system. LiDAR information, such as detected object data, is communicated from the LiDAR system to an on-board computing device, e.g., on-board computing device 220 of FIG. 2. The AV 102a may also communicate LiDAR data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the LiDAR systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a LiDAR system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The on-board computing device 220 may implemented using the computer system of FIG. 7. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, and mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR system 264 is communicated from those sensors) to the on-board computing device 220. The object detection information and/or captured images are processed by the on-board computing device 220 to detect objects in proximity to the vehicle. Any known or to be known technique for making an object detection based on sensor data and/or captured images can be used in the embodiments disclosed in this document.

LiDAR information is communicated from LiDAR system 264 to the on-board computing device 220. Additionally, captured images are communicated from the camera(s) 262 to the vehicle on-board computing device 220. The LiDAR information and/or captured images are processed by the vehicle on-board computing device 220 to detect objects in proximity to the vehicle. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., LiDAR or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
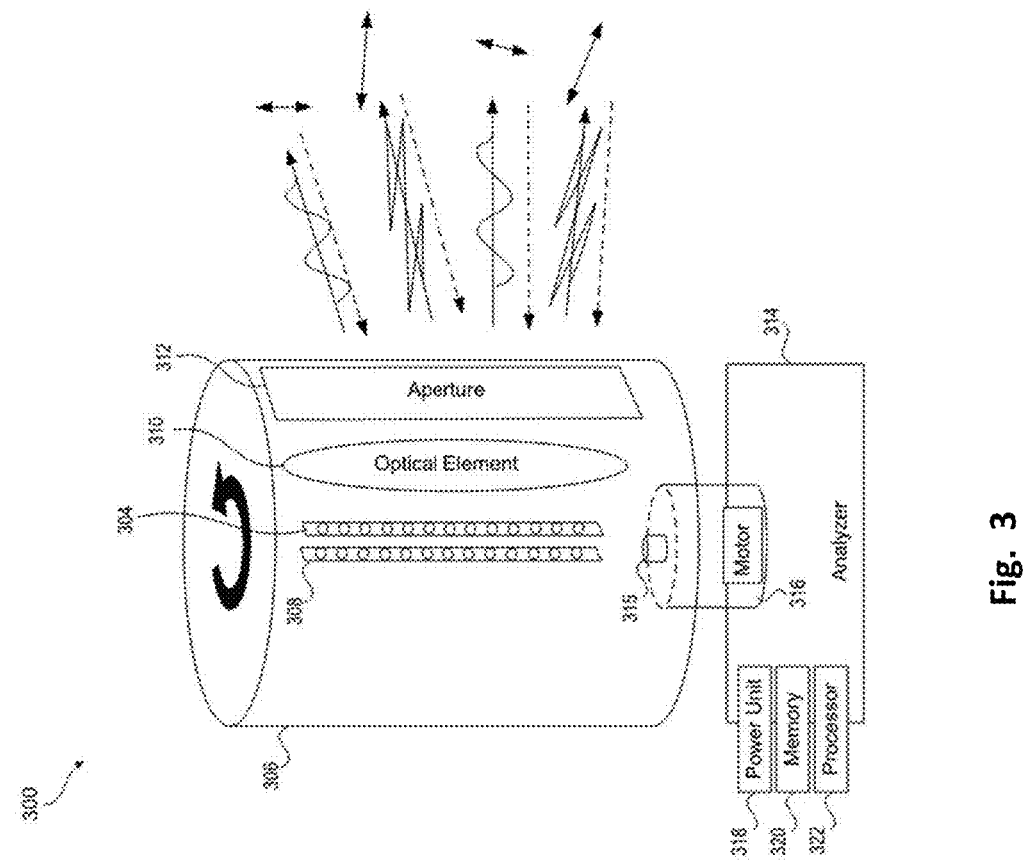
FIG. 3 illustrates an exemplary architecture for a Light Detection and Ranging ("LiDAR") system, in accordance with aspects of the disclosure.

FIG. 3 illustrates an exemplary architecture for a LiDAR system 300, in accordance with aspects of the disclosure. LiDAR system 264 of FIG. 2 may be the same as or substantially similar to the LiDAR system 300. As such, the discussion of LiDAR system 300 is sufficient for understanding LiDAR system 264 of FIG. 2. It should be noted that the LiDAR system 300 of FIG. 3 is merely an example LiDAR system and that other LiDAR systems are further completed in accordance with aspects of the present disclosure, as should be understood by those of ordinary skill in the art.

As shown in FIG. 3, the LiDAR system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The LiDAR system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

LiDAR system 300 includes a power unit 318 to power the light emitting unit 304, a motor 316, and electronic components. LiDAR system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Referring now to FIG. 4, FIG. 4 illustrates an exemplary process 400, in accordance with aspects of the disclosure.

As shown in FIG. 4, at step 402, process 400 includes obtaining sensor data associated with an environment surrounding an autonomous vehicle. For example, autonomous vehicle system 100 may obtain sensor data associated with an environment surrounding AV 102a. As an example, sensor data may include information and/or data from one or more of the sensors included in system architecture 200, such as camera(s) 262, LiDAR sensor system 264, Radar/Sonar 266, and/or the like. In such an example, one or more of the sensors included in system architecture 200 can be used to collect sensor data that includes information that describes a location (e.g., in three-dimensional space relative to AV 102a, etc.) of points that correspond to objects within the surrounding environment of AV 102a.

In some non-limiting embodiments or aspects, sensor data may include map data that defines one or more attributes of (e.g., metadata associated with) a roadway (e.g., attributes of a roadway in a geographic location, attributes of a segment of a roadway, attributes of a lane of a roadway, attributes of an edge of a roadway, attributes of a driving path of a roadway, etc.). In some non-limiting embodiments or aspects, an attribute of a roadway includes a road edge of a road (e.g., a location of a road edge of a road, a distance of location from a road edge of a road, an indication of whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), a centerline of a roadway (e.g., an indication of a centerline path in at least one lane of the roadway for controlling AV 102a during operation (e.g., following, traveling, traversing, routing, etc.) on a driving path, a driving path of a roadway (e.g., one or more trajectories that AV 102*a* can traverse in the roadway and an indication of the location of at least one feature in the roadway a lateral distance from the driving path, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

Figure 5:
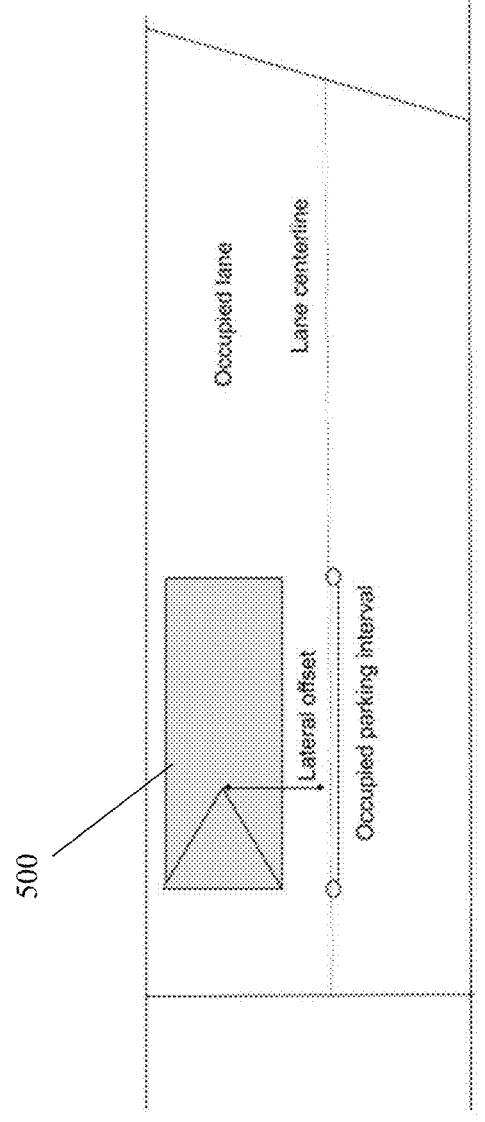
FIG. 5 illustrates an exemplary diagram of an environment including a road, in accordance with aspects of the disclosure.
Figure 6:
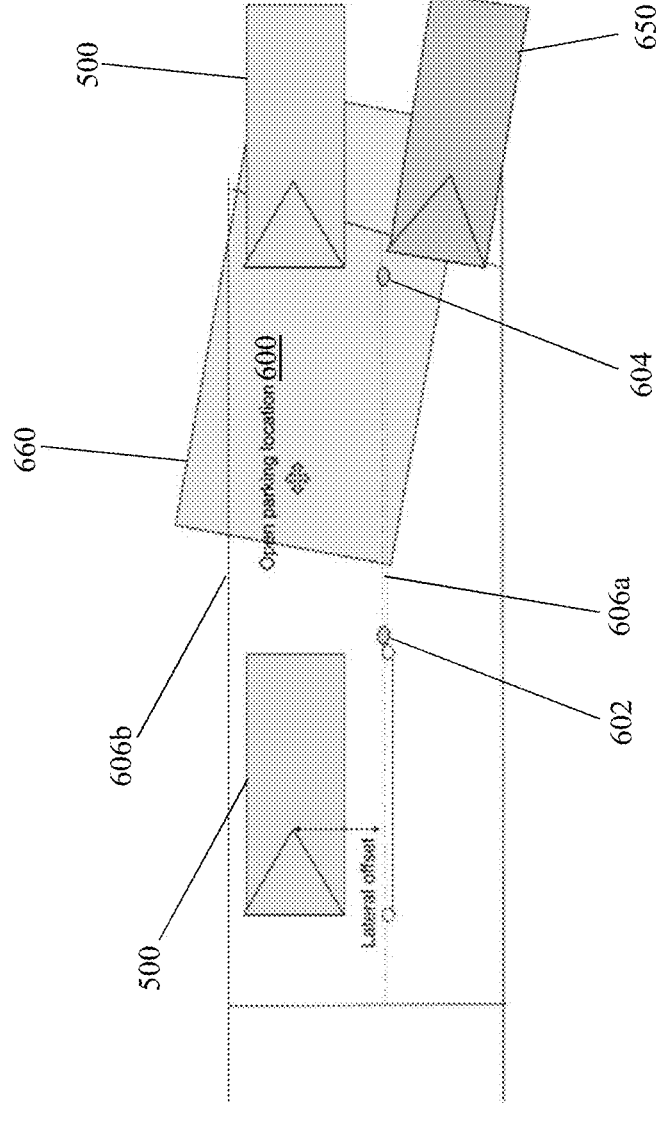
FIG. 6 illustrates an exemplary diagram of an environment including a road, in accordance with aspects of the disclosure.

As shown in FIG. 4, at step 404, process 400 includes identifying static objects in the environment. For example, and referring also to FIGS. 5 and 6, which illustrate exemplary diagrams of an environment including a road, autonomous vehicle system 100 may identify, based on the sensor data, a plurality of static objects 500 in the environment. As an example, autonomous vehicle system 100 (e.g., on-board computing device 220, etc.) may use any now or hereafter known object recognition algorithms, video tracking algorithms, and computer vision algorithms (e.g., track objects frame-to-frame iteratively over a number of time periods) to determine perception information of the surrounding environment of the AV 102*a* and/or for one or more identified objects in the environment, the current state of the object and/or predicted future locations, trajectories, and/or actions of the object.

Static objects 500 may include objects that autonomous vehicle system 100 (e.g., on-board computing device 220, etc.) determines, based on the sensor data, the perception information, the state information, and/or the predicted information, are not currently moving and/or are likely not to move during a future time period. For example, static objects may include parked vehicles, infrastructure (e.g., a sign, a bollard, etc.), roadway edges and/or markings, road infrastructure (e.g., driveways, etc.), temporary stationary objects (e.g., a residential trash can, a bike rack, etc.). As an example, vehicles intending to parallel park may do so because the vehicles are parking between one or more static objects. Static objects 500 may be distinguished from non-static objects or actors (e.g., vehicle 102*b*, etc.), which autonomous vehicle system 100 (e.g., on-board computing device 220, etc.) determines, based on the sensor data, the perception information, the state information, and/or the predicted information, are currently moving and/or are likely to move during a future time period.

As shown in FIG. 4, at step 406, process 400 includes identifying open parallel parking locations between static objects. For example, and referring again to FIG. 6, autonomous vehicle system 100 may identify, based on the sensor data, an open parallel parking location 600 (e.g., an area, a set of locations, etc.) between the plurality of static objects 500. As an example, an open parallel parking location 600 may include an open location between static objects that autonomous vehicle system 100 (e.g., on-board computing device 220, etc.) determines, based on the sensor data, the perception information, the state information, and/or the predicted information, satisfies one or more parking location conditions. In such an example, a parking location condition may include at least one of the following conditions: a location relative to a roadway and/or lane (e.g., a location on an outside of a roadway, etc.), a size range (e.g., an area range, a length range, a width range, etc.), a lateral offset from a lane centerline and/or a lane marking, or any combination thereof. For example, autonomous vehicle system 100 may identify an open parallel parking location 600 by determining, based on the plurality of static objects, the sensor data, the perception information, the state information, and/or the predicted information, one or more sides of the open parallel parking location, such as a first end 602 of the open parallel parking location 600, a second end 604 of the open parallel parking location 600, and/or sides 606*a* and 606*b* (and/or one or more additional sides depending on a shape of the parallel parking location) of the open parallel parking location 600 that satisfy one or more of the parking location conditions. As an example, an area of the open parallel parking location 600 defined by the first end 602, the second end 604, and/or the sides 606*a* and 606*b* may be determined to satisfy a predetermined location condition relative to the roadway and/or a lane and/or a predetermined size condition to be identified as an open parallel parking location.

In this way, an open parallel parking location 600 identified by autonomous vehicle system 100 need not correspond to a designated parking location or area (e.g., may not be associated with map data or information identifying the location or area as a designated parking area, etc.). For example, autonomous vehicle system 100 may identify an open parallel parking location 600 between static objects on a road shoulder and/or between static objects completely outside lanes of a roadway. Further, an open location may not be identified as an open parallel parking location if the location is smaller than a size range (e.g., too small for parking, etc.) or if the location is greater than the size range (e.g., parkers may typically pull front-ways directly into larger spaces without attempting parallel parking, etc.).

As shown in FIG. 4, at step 408, process 400 includes identifying a vehicle that satisfies a parallel parking condition. For example, and referring again to FIG. 6, autonomous vehicle system 100 may identify, based on the sensor data, a vehicle 650 (e.g., a non-static object, an actor, vehicle 102*b*, etc.) in the environment that satisfies a parallel parking condition. As an example, a vehicle 650 that satisfies a parallel parking condition may include a vehicle that autonomous vehicle system 100 (e.g., on-board computing device 220, etc.) determines, based on the sensor data, the perception information, the state information, and/or the predicted information, satisfies one or more parallel parking conditions. In such an example, a parallel parking condition may include at least one of the following conditions: an object classification associated with the vehicle (e.g., a type of the vehicle, etc.), a size associated with the vehicle (e.g., an area, a length, a width, a number of axles, etc.), a location associated with the vehicle, a current and/or prediction motion associated with the vehicle, or any combination thereof.

As shown in FIG. 4, at step 410, process 400 includes generating a polygon that extends beyond a side and a rear of the autonomous vehicle. For example, and referring again to FIG. 6, autonomous vehicle system 100 may generate a polygon 660 that extends beyond a side and a rear of vehicle 650 that satisfies the parallel parking condition. As an example, in response to identifying the vehicle 650 that satisfies the parallel parking condition, autonomous vehicle system 100 may generate a polygon 660 that extends beyond a side (e.g., a side closer to the open parallel parking location 600, etc.) and a rear of vehicle 650. In such an example, autonomous vehicle system 100 may generate a bounding box or polygon 660 around vehicle 650 and generate polygon 660 that extends beyond a side and a rear of the bounding box or polygon 660 around vehicle 650.

In some non-limiting embodiments or aspects, autonomous vehicle system 100 may generate a polygon 660 that includes a predetermined area that extends beyond the side and the rear of vehicle 650 (e.g., that extends a predetermined distance beyond the rear of vehicle 650 and another predetermined distance beyond the side of vehicle 650, etc.).

In some non-limiting embodiments or aspects, autonomous vehicle system 100 may generate a polygon 660 that includes an area that extends beyond the side and the rear of the vehicle that is determined based on an attribute associated with the vehicle. For example, an attribute associated with a vehicle may include at least one of the following attributes: a size associated with the vehicle (e.g., a length, a width, a number of axles, etc.), a type associated with the vehicle, a turning radius associated with the vehicle, or any combination thereof.

As shown in FIG. 4, at step 412, process 400 includes determining a prediction that the vehicle is intending to parallel park in the open parallel parking location 600. For example, autonomous vehicle system 100 may determine a prediction or forecast that vehicle 650 is intending to parallel park in the open parallel parking location 600 based on an amount of the open parallel parking location 600 that is contained within polygon 660 (and/or vice-versa).

In some non-limiting embodiments or aspects, autonomous vehicle system 100 may automatically determine that vehicle 650 is intending to parallel park in response to an amount of the open parallel parking location 600 being contained within polygon 660.

In some non-limiting embodiments or aspects, autonomous vehicle system 100 may apply one or more heuristic algorithms to an amount of the open parallel parking location 600 that is contained within polygon 660 and/or one or more parameters or attributes of the sensor data, the perception information, the state information, and/or the predicted information to determine the prediction that vehicle 650 is intending to parallel park.

In some non-limiting embodiments or aspects, autonomous vehicle system 100 may generate a model (e.g., an estimator, a classifier, a prediction model, a detector model, etc.) using machine learning techniques including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The machine learning model may be trained to provide an output including a prediction of whether vehicle 650 is intending to parallel park in response to input including an amount of the open parallel parking location 600 that is contained within polygon 660 and/or one or more parameters or attributes of the sensor data, the perception information, the state information, and/or the predicted information. For example, autonomous vehicle system 100 may train the model based on training data associated with one or more amounts of one or more open parallel parking locations 600 that are contained with one or more polygons 660 generated for one or more vehicles that satisfy a parallel parking condition and/or one or more parameters or attributes of the sensor data, the perception information, the state information, and/or the predicted information associated therewith. In such an example, a prediction that vehicle 650 is intending to parallel park may include a probability score associated with the prediction. For example, the prediction may include a probability that vehicle 650 is intending to parallel park.

In some non-limiting embodiments, autonomous vehicle system 100 may store the model (e.g., store the model for later use). In some non-limiting embodiments or aspects, autonomous vehicle system 100 may store the model in a data structure (e.g., a database, a linked list, a tree, etc.). In some non-limiting embodiments or aspects, the data structure is located within autonomous vehicle system 100 or external (e.g., remote from) autonomous vehicle system 100 (e.g., within remote computing device 110, etc.).

As shown in FIG. 4, at step 414, process 400 includes controlling travel of the autonomous vehicle system 100 based on the prediction that the vehicle is intending to parallel park in the open parallel parking location 600. For example, autonomous vehicle system 100 may control movement of AV 102a based on the prediction that vehicle 650 is intending to parallel park in the open parallel parking location 600. As an example, system 100 may control AV 102a to slow down, speed up, and/or bias lateral positioning within a lane or roadway based on the prediction that vehicle 650 is intending to parallel park in the open parallel parking location 600. As an example, AV 102a traveling on a route or a path in a lane may determine, based on the prediction that vehicle 650 is intended to parallel park in the open parallel parking location 600, whether to maintain a distance between AV 102a and vehicle 650 that is greater than a default distance and/or whether to bias lateral positioning within a lane or roadway to go around vehicle 650. For example, autonomous vehicle system 100 may control AV 102a to maintain a distance between the autonomous vehicle and the vehicle predicted to be parallel parking that is greater than a default distance (e.g., stopping AV 102a a distance before the parking spot to give vehicle 650 room to parallel park, etc.) and/or to bias lateral positioning within a lane or roadway to go around the vehicle predicted to be parallel parking. In such an example, a default distance between AV 102a and vehicle 650 may depend upon various factors, such as whether vehicle 650 is moving or stopped, whether AV 102a is approaching a traffic signal light or stop sign which autonomous vehicle must obey, and/or the like.

Figure 7:
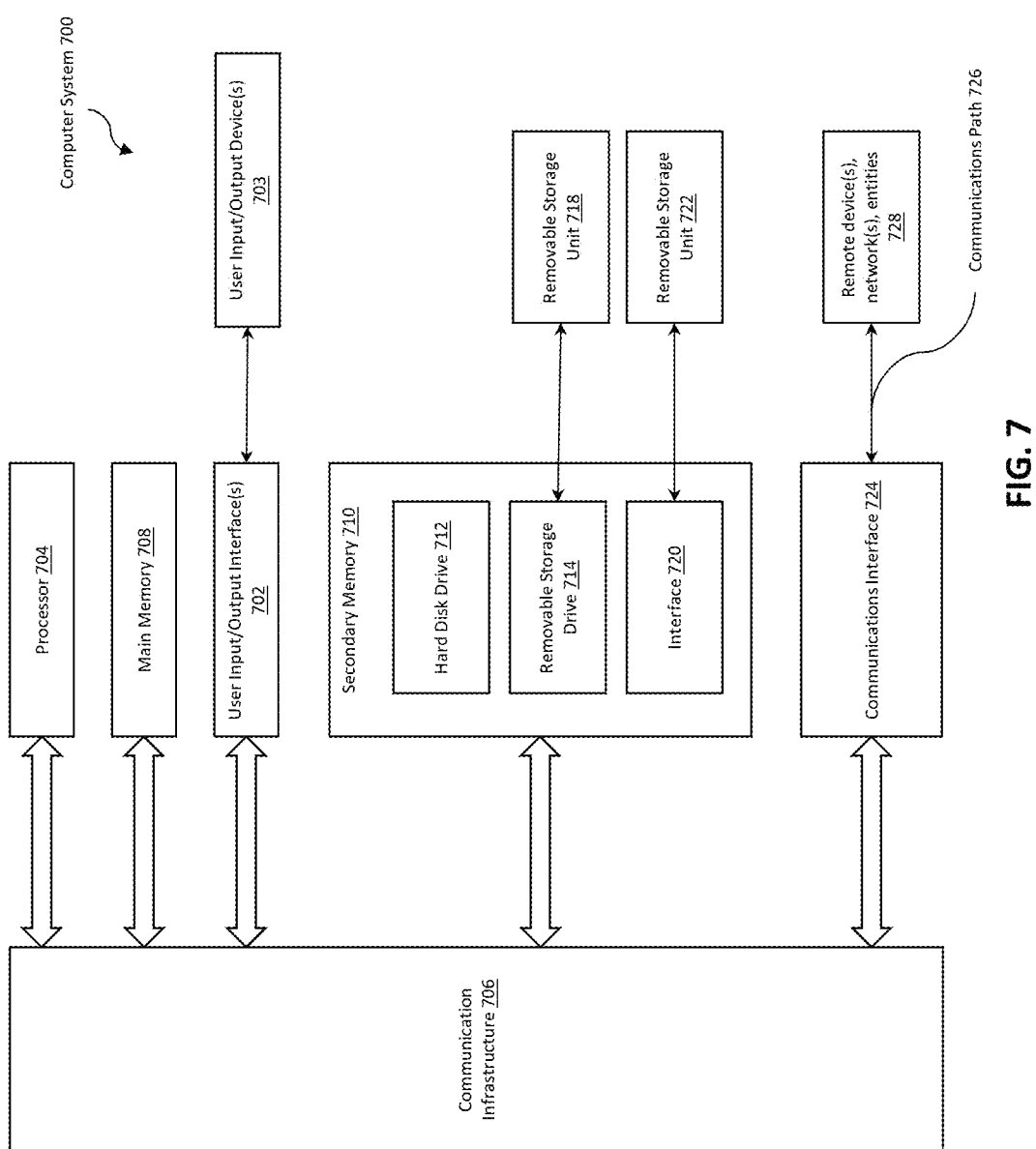
FIG. 7 is an example computer system useful for implementing various embodiments.

Various embodiments can be implemented, for example, using one or more computer systems, such as computer system 700 shown in FIG. 7. Computer system 700 can be any computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer usable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

obtaining, with at least one processor, sensor data associated with an environment surrounding an autonomous vehicle;

identifying, with the at least one processor, based on the sensor data, a plurality of static objects in the environment, an open parallel parking location between the plurality of static objects, and a vehicle in the environment that satisfies a parallel parking condition;

in response to identifying the vehicle that satisfies the parallel parking condition, generating, with the at least one processor, a polygon that extends beyond a side and a rear of the vehicle that satisfies the parallel parking condition based on a turning radius associated with the vehicle; and controlling, with the at least one processor, movement of the autonomous vehicle based on a prediction that the vehicle is intending to parallel park in the open parallel parking location, wherein the prediction that the vehicle is intending to parallel park in the open parallel parking location is determined based on an amount of the open parallel parking location that is contained within the polygon.

2. The method of claim 1, wherein identifying the open parallel parking location includes determining, based on the plurality of static objects, one or more sides of the open parallel parking location.

3. The method of claim 1, wherein the parallel parking condition includes at least one of the following conditions: an object classification associated with the vehicle, a size associated with the vehicle, a location associated with the vehicle, a current and/or prediction motion associated with the vehicle, or any combination thereof.

4. The method of claim 1, wherein the polygon includes a predetermined area that extends beyond the side and the rear of the vehicle.

5. The method of claim 1, wherein an area in which the polygon extends beyond the side and the rear of the vehicle is determined based on an attribute associated with the vehicle, and wherein the attribute associated with the vehicle includes at least one of the following: a size associated with the vehicle, a type associated with vehicle, or any combination thereof.

6. The method of claim 1, wherein the prediction that the vehicle is intending to parallel park includes a probability that the vehicle is intending to parallel park.

7. The method of claim 1, wherein controlling movement of the autonomous vehicle includes at least one of: controlling the autonomous vehicle to maintain a distance between the autonomous vehicle and the vehicle predicted to be parallel parking that is greater than a default distance and controlling the autonomous vehicle to bias lateral positioning within a lane or roadway to go around the vehicle predicted to be parallel parking.

8. A system, comprising:
a memory; and
at least one processor coupled to the memory and configured to:
  obtain sensor data associated with an environment surrounding an autonomous vehicle;
  identify, based on the sensor data, a plurality of static objects in the environment, an open parallel parking location between the plurality of static objects, and a vehicle in the environment that satisfies a parallel parking condition;
  in response to identifying the vehicle that satisfies the parallel parking condition, generate a polygon that extends beyond a side and a rear of the vehicle that satisfies the parallel parking condition; and
  control movement of the autonomous vehicle based on a prediction that the vehicle is intending to parallel park in the open parallel parking location, wherein the prediction that the vehicle is intending to parallel park in the open parallel parking location is determined based on an overlap of the open parallel parking location and the polygon being above a threshold.

9. The system of claim 8, wherein the at least one processor is further configured to identify the open parallel parking location by determining, based on the plurality of static objects, one or more sides of the open parallel parking location.

10. The system of claim 8, wherein the parallel parking condition includes at least one of the following conditions: an object classification associated with the vehicle, a size associated with the vehicle, a location associated with the vehicle, a current and/or prediction motion associated with the vehicle, or any combination thereof.

11. The system of claim 8, wherein the polygon includes a predetermined area that extends beyond the side and the rear of the vehicle.

12. The system of claim 8, wherein an area in which the polygon extends beyond the side and the rear of the vehicle is determined based on an attribute associated with the vehicle, and wherein the attribute associated with the vehicle includes at least one of the following: a size associated with the vehicle, a type associated with vehicle, or any combination thereof.

13. The system of claim 8, wherein the prediction that the vehicle is intending to parallel park includes a probability that the vehicle is intending to parallel park.

14. The system of claim 8, wherein the at least one processor is further configured to control movement of the autonomous vehicle by at least one of: controlling the autonomous vehicle to maintain a distance between the autonomous vehicle and the vehicle predicted to be parallel parking that is greater than a default distance and controlling the autonomous vehicle to bias lateral positioning within a lane or roadway to go around the vehicle predicted to be parallel parking.

15. A non-transitory computer-readable medium having instructions stored thereon that, when executed by at least one computing device, cause the at least one computing device to perform operations comprising:
  obtaining sensor data associated with an environment surrounding an autonomous vehicle;
  identifying, based on the sensor data, a plurality of static objects in the environment, an open parallel parking location between the plurality of static objects, and a vehicle in the environment that satisfies a parallel parking condition;
  in response to identifying the vehicle that satisfies the parallel parking condition, generating a polygon that extends beyond a side and a rear of the vehicle that satisfies the parallel parking condition; and
  controlling movement of the autonomous vehicle based on a prediction that the vehicle is intending to parallel park in the open parallel parking location, wherein the prediction that the vehicle is intending to parallel park in the open parallel parking location is determined based on an amount of the open parallel parking location that is contained within the polygon.

16. The non-transitory computer-readable medium of claim 15, wherein the instructions, when executed by the at least one computing device, further cause the at least one computing device to identify the open parallel parking location by determining, based on the plurality of static objects, one or more sides of the open parallel parking location.

17. The non-transitory computer-readable medium of claim 15, wherein the parallel parking condition includes at least one of the following conditions: an object classification associated with the vehicle, a size associated with the vehicle, a location associated with the vehicle, a current and/or prediction motion associated with the vehicle, or any combination thereof.

18. The non-transitory computer-readable medium of claim 15, wherein the polygon includes a predetermined area that extends beyond the side and the rear of the vehicle.

19. The non-transitory computer-readable medium of claim 15, wherein an area in which the polygon extends beyond the side and the rear of the vehicle is determined based on an attribute associated with the vehicle, and wherein the attribute associated with the vehicle includes at least one of the following: a size associated with the vehicle, a type associated with vehicle, or any combination thereof.

20. The non-transitory computer-readable medium of claim 15, wherein the instructions, when executed by the at least one computing device, further cause the at least one computing device to control movement of the autonomous vehicle by at least one of: controlling the autonomous vehicle to maintain a distance between the autonomous vehicle and the vehicle predicted to be parallel parking that is greater than a default distance and controlling the autonomous vehicle to bias lateral positioning within a lane or roadway to go around the vehicle predicted to be parallel parking.

\* \* \* \* \*